United States Patent
Cheng et al.

(10) Patent No.: US 11,241,961 B2
(45) Date of Patent: Feb. 8, 2022

(54) VEHICLE INSTRUMENT, DISPLAY METHOD OF THE SAME, AND VEHICLE SPEED MONITORING DISPLAY SYSTEM

(71) Applicant: Shanghai Tianma AM-OLED Co., Ltd., Shanghai (CN)

(72) Inventors: Shuang Cheng, Shanghai (CN); Jinghua Niu, Shanghai (CN); Mingzhi Dai, Shanghai (CN); Yinhe Liu, Shanghai (CN); Yibin Xing, Shanghai (CN); Ruixuan Dang, Shanghai (CN); Tiezhen Gao, Shanghai (CN)

(73) Assignee: SHANGHAI TIANMA AM-OLED CO, LTD., Shanghai (CN)

( * ) Notice: Subject to any disclaimer, the term of this patent is extended or adjusted under 35 U.S.C. 154(b) by 102 days.

(21) Appl. No.: 16/729,159

(22) Filed: Dec. 27, 2019

(65) Prior Publication Data
US 2021/0122240 A1 Apr. 29, 2021

(30) Foreign Application Priority Data
Oct. 29, 2019 (CN) .......................... 201911037551.4

(51) Int. Cl.
*G09G 3/00* (2006.01)
*B60K 35/00* (2006.01)
*G06F 3/147* (2006.01)

(52) U.S. Cl.
CPC .............. *B60K 35/00* (2013.01); *G06F 3/147* (2013.01); *B60K 2370/151* (2019.05);
(Continued)

(58) Field of Classification Search
USPC .............. 345/31, 13, 174, 30; 715/761, 773; 348/148
See application file for complete search history.

(56) References Cited

U.S. PATENT DOCUMENTS

2013/0233120 A1* 9/2013 Golomb ............... B60Q 1/0082
74/552
2013/0249814 A1* 9/2013 Zeng ..................... G06F 3/0488
345/173
(Continued)

FOREIGN PATENT DOCUMENTS

CN 1650240 A 8/2005
CN 203995927 U 12/2014
(Continued)

OTHER PUBLICATIONS

First Chinese Office Action, dated Oct. 16, 2020, issued in corresponding Chinese Application No. 201911037551.4, filed Oct. 29, 2019, 21 pages.

*Primary Examiner* — Thuy N Pardo
(74) *Attorney, Agent, or Firm* — Christensen O'Connor Johnson Kindness

(57) ABSTRACT

Provided are a vehicle instrument, a display method, and a vehicle speed monitoring display system. The vehicle instrument includes a display panel including an indicator structure used together with a scale on the dial for reading; a dial exposed by the display panel; and an actuating mechanism connected to the display panel and configured to control a movement of the display panel relative to the dial. The vehicle instrument has a first state, in which the display panel and the dial are in a first positional relationship, the display panel displays a first pattern region, and the first pattern region and the dial are in a second positional relationship; and a second state, in which the display panel and the dial are in a third positional relationship, the display panel displays the first pattern region, and the first pattern region and the dial are in the second positional relationship.

20 Claims, 10 Drawing Sheets

(52) U.S. Cl.
CPC .. *B60K 2370/167* (2019.05); *B60K 2370/199* (2019.05); *B60K 2370/52* (2019.05)

(56) References Cited

U.S. PATENT DOCUMENTS

| | | | | |
|---|---|---|---|---|
| 2014/0022070 | A1* | 1/2014 | Golomb | B60Q 1/40 340/475 |
| 2015/0146000 | A1* | 5/2015 | De Wind | B60R 1/12 348/148 |
| 2015/0286396 | A1* | 10/2015 | Zeng | G06F 3/0488 715/773 |
| 2016/0085302 | A1* | 3/2016 | Publicover | G02B 27/017 345/633 |
| 2016/0137271 | A1* | 5/2016 | MacCready | G05D 1/0206 114/338 |
| 2016/0196098 | A1* | 7/2016 | Roth | B60K 35/00 715/761 |
| 2016/0243941 | A1* | 8/2016 | Kishida | B60K 35/00 |
| 2016/0243959 | A1* | 8/2016 | Kishida | B60W 20/13 |
| 2018/0181274 | A1* | 6/2018 | Jung | G06F 3/0362 |
| 2019/0288916 | A1* | 9/2019 | Ricci | G07C 5/085 |
| 2020/0039345 | A1* | 2/2020 | Korson | B60K 11/04 |
| 2020/0039444 | A1* | 2/2020 | Rook | G06F 3/041 |
| 2020/0110512 | A1* | 4/2020 | Chen | G06F 3/1423 |
| 2021/0152784 | A1* | 5/2021 | Lu | G06T 3/4038 |

FOREIGN PATENT DOCUMENTS

| | | |
|---|---|---|
| CN | 105946581 A | 9/2016 |
| CN | 107068203 A | 8/2017 |

* cited by examiner

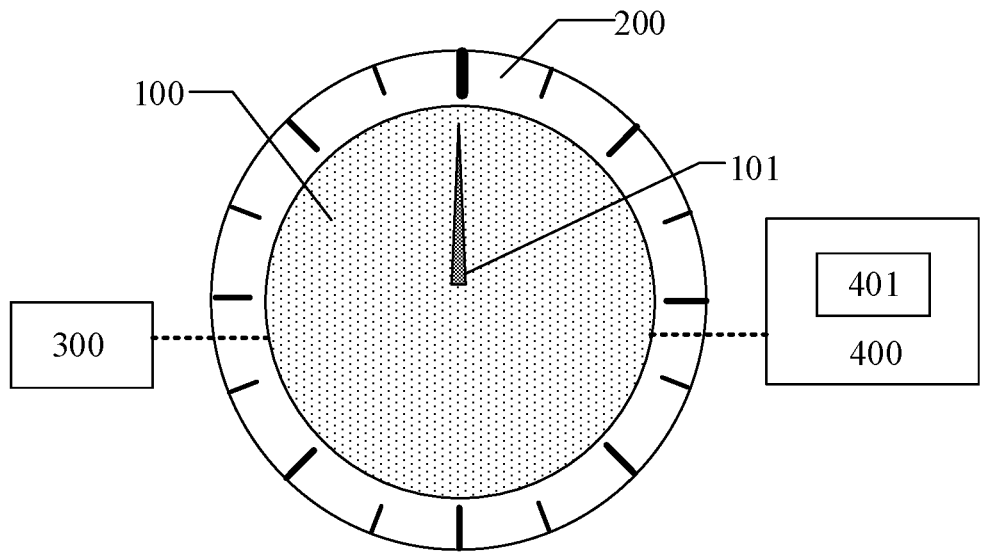

FIG. 8

```
the display control module receives a display instruction, which
includes display data information and rotation information
```
↓
```
the angle calculation sub-module calculates the rotation angle value
of the display panel based on the received rotation information
```
↓
```
the display control module controls the display panel to perform
display based on the display data information and the rotation angle
value
```

FIG. 9

VEHICLE INSTRUMENT, DISPLAY METHOD OF THE SAME, AND VEHICLE SPEED MONITORING DISPLAY SYSTEM

CROSS-REFERENCE TO RELATED APPLICATIONS

The present disclosure claims priority to Chinese Patent Application No. 201911037551.4, filed on Oct. 29, 2019, the content of which is incorporated herein by reference in its entirety.

TECHNICAL FIELD

The present disclosure relates to the field of display technologies, and more particularly, to a vehicle instrument, a display method of the vehicle instrument, and a vehicle speed monitoring display system.

BACKGROUND

Currently, display instrument boards used in vehicles are usually manufactured with an OLED (Organic Light-Emitting Diode) display screen having a relatively long service life and high reliability. The instrument manufactured with the OLED display screen has a high contrast ratio and a good display effect while achieving an integrated design with car body in such a manner that the display screen can be visually hidden when no display is needed.

As sub-pixels of three colors (RGB) in the OLED display screen have different service-life decay curves, and a burn-in of the screen may occur when displaying the same pattern for a long period, resulting in display abnormality. In addition, the OLED display screen, as an electronic display screen, may cause display failure when it encounters an accidental impact during the vehicle travel. If the above-mentioned display abnormality occurs during the vehicle travel, the driver cannot read the instrument parameters normally, leading to a certain safety hazard.

SUMMARY

In view of above, the present disclosure provides a vehicle instrument and a display method thereof, as well as a vehicle speed monitoring display system, aiming to lower the risk of burn-in of the display instrument while reducing the security hazards caused by a display abnormality.

In a first aspect, the present disclosure provides a vehicle instrument, including a display panel, a dial, and an actuating mechanism. The display panel includes a display panel including an indicator structure; a dial exposed by the display panel; and an actuating mechanism connected to the display panel and configured to control a movement of the display panel relative to the dial. The indicator structure is used together with a scale on the dial for reading. The vehicle instrument has a first state and a second state. In the first state, the display panel and the dial are in a first positional relationship, the display panel displays a first pattern region, and the first pattern region and the dial are in a second positional relationship. In the second state, the display panel and the dial are in a third positional relationship, the display panel displays the first pattern region, and the first pattern region and the dial are in the second positional relationship.

In a second aspect, the present disclosure, based on the same invention concept, further provides a display method of a vehicle instrument. The vehicle instrument includes a display panel and a dial. The display panel includes an indicator structure. The indicator structure is used together with a scale on the dial for reading. The indicator structure is disposed at a display side of the display panel. The dial is exposed by the display panel. The display method includes: controlling the vehicle instrument to be in a first state, wherein in the first state, the display panel and the dial are in a first positional relationship, the display panel displays a first pattern region, and the first pattern region and the dial are in a second positional relationship; and controlling the vehicle instrument to be in a second state, wherein in the second state, the display panel and the dial are in a third positional relationship, the display panel displays the first pattern region, and the first pattern region and the dial are in the second positional relationship.

In a third aspect, the present disclosure further provides a vehicle speed monitoring display system, including a vehicle speed monitoring module, and the vehicle instrument according to the first aspect of the present disclosure. The vehicle speed monitoring module is configured to monitor a travelling speed of a vehicle, and the vehicle speed monitoring module is connected to the vehicle instrument.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art.

FIG. 8 is a simplified schematic diagram of a vehicle instrument according to yet another embodiment of the present disclosure;

FIG. 9 is a display flow diagram of the vehicle instrument according to the embodiment shown in FIG. 8;

DESCRIPTION OF EMBODIMENTS

For a better understanding of the present disclosure, embodiments of the present disclosure will be described in detail with reference to the drawings It should be noted that the described embodiments are merely a part of, rather than all of the embodiments of the present disclosure. On basis of the embodiments described in the present disclosure, other embodiments obtained by those skilled in the art without any creative efforts shall fall within the protection scope of the present disclosure.

The terms used in the embodiments of the present disclosure are merely for the purpose of describing particular embodiments, but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

Figure 1:
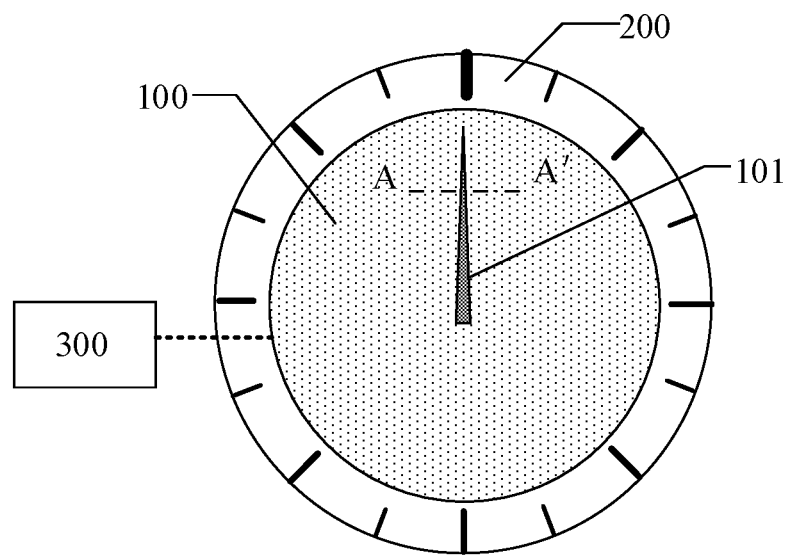
FIG. 1 is a simplified schematic diagram of a vehicle instrument according to an embodiment of the present disclosure.
Figure 2:
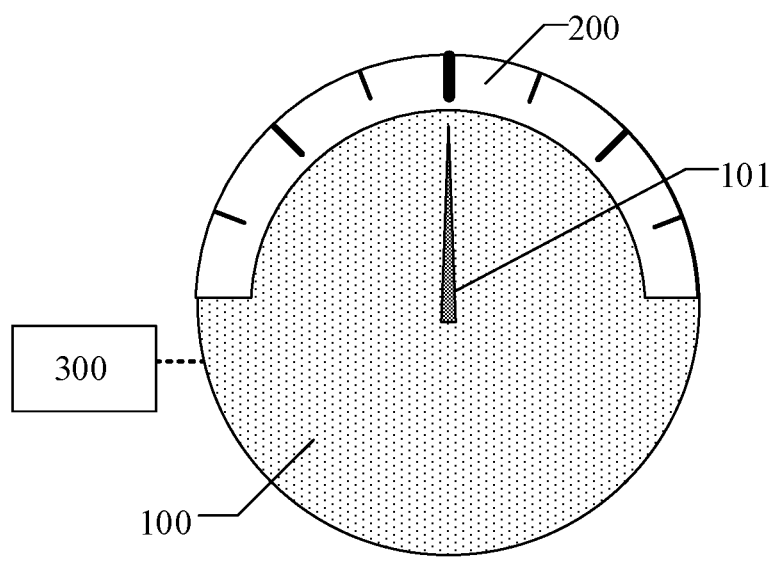
FIG. 2 is a simplified schematic diagram of a vehicle instrument according to another embodiment of the present disclosure.
Figure 3:
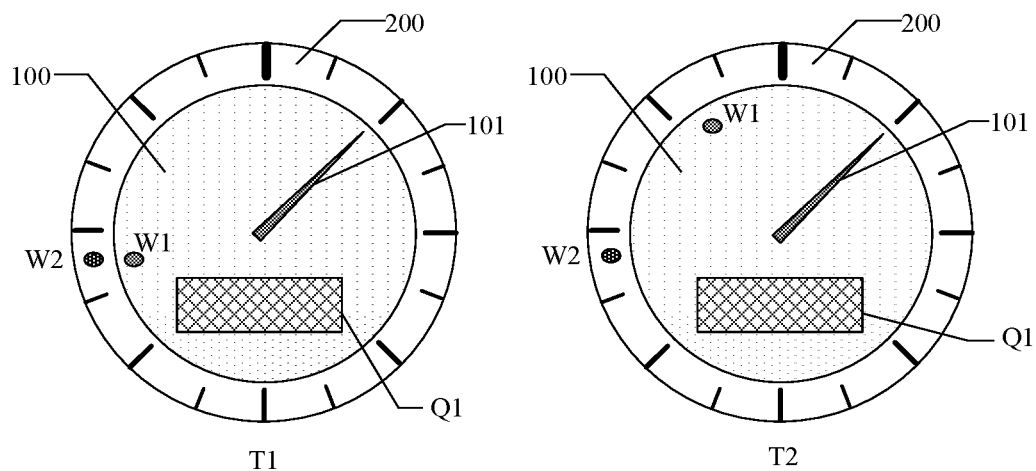
FIG. 3 is a first comparison schematic diagrams of a first state and a second state of a vehicle instrument according to an embodiment of the present disclosure.
Figure 4:
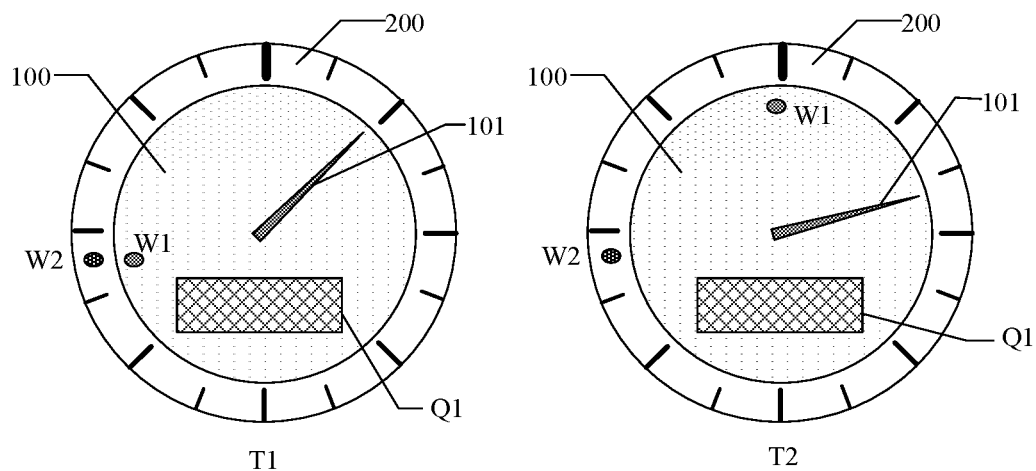
FIG. 4 is a second comparison schematic diagrams of a first state and a second state of a vehicle instrument according to an embodiment of the present disclosure.

FIG. 1 is a simplified schematic diagram of a vehicle instrument according to an embodiment of the present disclosure. FIG. 2 is a simplified schematic diagram of a vehicle instrument according to another embodiment of the present disclosure. FIG. 3 is a first comparison schematic diagrams of a first state and a second state of a vehicle instrument according to an embodiment of the present disclosure. FIG. 4 is a second comparison schematic diagrams of a first state and a second state of a vehicle instrument according to an embodiment of the present disclosure. As shown in FIG. 1 and FIG. 2, the vehicle instrument includes: a display panel 100, a dial 200, and an actuating mechanism 300. The display panel 100 has an indicator structure 101 for reading with a scale on the dial 200. The indicator structure 101 can be a solid structure present on the display panel 100 or a pattern displayed on a display screen of the display panel 100. The display panel 100 exposes the dial 100, i.e., in a normal use state, the user can see the pattern displayed on the display panel 100 and the scale on the dial 200 simultaneously. Shapes of the display panel 100 and the dial 200 are only schematically shown in the drawings, and FIG. 1 illustrates that the dial 200 is disposed around the display panel 100 and FIG. 2 illustrates that the dial 200 is disposed around a half of a display region of the display panel 100. In an embodiment, the scale on the dial 200 is a scale mark. In a certain state, based on a position of the scale mark pointed by the indicator structure 101, reading information can be read as indicated by the vehicle instrument in such a state. In an embodiment, the scale on the dial 200 corresponds to various prompt information, which can be vehicle status information, such as door state, cabin door state, window state, fuel capacity state, and the like. The information that can be displayed by patterns can be correspondingly indicated on the dial in a form of the scale, so that the vehicle status information can be read based on the scale position pointed by the indicator structure. In an embodiment, the scale on the dial 200 can also indicate information about a vehicle speed. The actuating mechanism 300 is connected to the display panel 100, and the actuating mechanism 300 is configured to control a movement of the display panel 100 relative to the dial 200. The display panel 100 described in the embodiments of present disclosure moves relative to the dial 200, which means that the actuating mechanism 300 controls changes of a relative position of the display panel 100 and the dial 200. In other words, the relative position of the display panel 100 and the dial 200 is not fixed during the use of the vehicle instrument. The display panel 100 can rotate relative to the dial 200, or the display panel 100 can move up and down or left and right with respect to the dial 200. Instead of showing the specific structure, the actuating mechanism 300 is only illustratively shown as a block. The actuating mechanism 300 is a structure capable of controlling the movement of the display panel 100 relative to the dial 200, and there are various specific implementations thereof, which will be illustratively described in specific examples.

The vehicle instrument has a first state and a second state. In the first state, the display panel 100 and the dial 200 are in a first positional relationship, the display panel 100 displays a first pattern region, and the first pattern region and the dial 200 are in a second positional relationship. In the second state, the display panel 100 and the dial 200 are in a third positional relationship, the display panel 100 displays the first pattern region, and the first pattern region and the dial 200 are in the second positional relationship. That is, in two different states, the position of the pattern region displayed by the display panel is unchanged with respect to the position of the dial 200, i.e., the relative position of the display panel and the dial is changed in the two states. In the two states, content displayed in the first pattern region can be the same or different.

Referring to FIG. 3, for clearly illustrating the relative positional relationship between the display panel 100 and the dial 20, a position point W1 on the display panel 100 and a position point W2 on the dial 200 are indicated in FIG. 3. As shown in this figure, in the first state T1 and the second state T2, the display panel 100 displays the same pattern region Q1 (i.e., the first pattern region). That is, in these two states, the relative positions of the pattern region Q1 and the point W2 are the same. In other words, in both the first state T1 and the second state T2, the first pattern region and the dial 200 are in the second positional relationship, the pattern region Q1 displayed on the display panel is stationary relative to the dial 200. In the first state T1, the position point W1 and the position point W2 are relatively close (the display panel 100 and the dial 200 are in the first positional relationship), and in the second state T2, the relative position of the position point W1 and the position point W2 is changed (the display panel 100 and dial 200 are in the second positional relationship). It can be seen that, in these two states, the relative positions of the displayed pattern region Q1 and dial 200 are unchanged, but the relative positions of the display panel 100 and the dial 200 are different, and thus pixels actually used to emit light and display pattern in display panel 100 are not exactly the same in these two states.

FIG. 3 illustrates a situation in which the indicator structure 101 in the display panel 100 points to the same scale position on the dial 200 in two states. In another embodiment, as shown in FIG. 4, in the first state T1 and the second state T2, the indicator structure 101 in the display panel 100 points to different scale positions on the dial 200, i.e., in some cases when the indicator structure 101 and the dial 200 together indicate different vehicle information, the relative positions of the display panel 100 and the dial 200 may be different.

It should be noted that a relative positional change between the position point W1 and the position point W2 indicates a relative positional change between the display panel 100 and the dial 200 in FIG. 3 and FIG. 4, and the position point W1 and the position point W2 are only used for explaining the principle of the embodiments of the present disclosure, and are not necessarily present in the actual products. In the figures, a display pattern of the vehicle speed information is shown as example. The content that the vehicle instrument can display is not specifically limited in the embodiments of the present disclosure, which can be vehicle speed, mileage, fuel capacity, or other important prompt information.

In the vehicle instrument according the embodiment of the present disclosure, the vehicle information can be read by combing the display panel and the dial. In use, the display region on the display panel can display a pattern, and the user can get the vehicle information displayed by the display panel once the user looks at the content displayed by the pattern. In the meantime, the user can also obtain the vehicle information indicated by the dial through reading the scale on the dial to which the indicator structure points. The vehicle information indicated by the indicator structure together with the dial is identical to the vehicle information displayed by the display panel, such that the user can still be informed of the current vehicle status information by reading information indicated by the indicator structure and the dial even when the display panel cannot display normally. In this way, the user can make a correct judgment of the current vehicle status, and thus reduce the security hazards caused by the display abnormality. In addition, the actuating mechanism controls the display panel to move relative to the dial. In different states, the display panel displays the same pattern region, but the display panel and the dial are in different relative positional relationships. In this way, the pixels used to display the pattern in the display panel are not exactly the same in different states, thereby preventing the burn-in caused by the long-term use of the pixels at the same positions for displaying the pattern.

In an embodiment, the indicator structure is a solid structure disposed on the display panel, and a position of the indicator structure is fixed on the display panel. The display panel moves relative to the dial, such that the indicator structure can point to different scales on the dial, and a displacement of the display panel is related to the scale to which the indicator structure points.

In an embodiment, the indicator structure is a solid structure disposed on the display panel, and the position of the indicator structure is not fixed on the display panel. The display panel moves relative to the dial, and the indicator structure can point to different scales on the dial by moving relative to the dial. Since the position of the indicator structure is not fixed on the display panel, the displacement of the indicator structure is independent on the displacement of the display panel, i.e., the displacement of the display panel is independent on the scale to which the indicator structure points.

In an embodiment, the indicator structure is a pattern displayed by the display panel, and the display panel can be controlled to display the indicator structure at a fixed position, such that the position of the indicator structure is fixed on the display panel. The display panel can also be controlled to display the indicator structure at a variable position, such that the position of the indicator structure is not fixed on the display panel.

In the vehicle instrument provided by the embodiment of the present disclosure, the indicator structure includes any one of an indicator line, an indicator needle, and an indicator symbol. In the accompanying drawings of the present disclosure, the indicator structure is illustrated as the indicator needle. The indicator line can be a line indicating a direction, and the indicator symbol can be a symbol in any shape which can indicate a direction.

Figure 5:
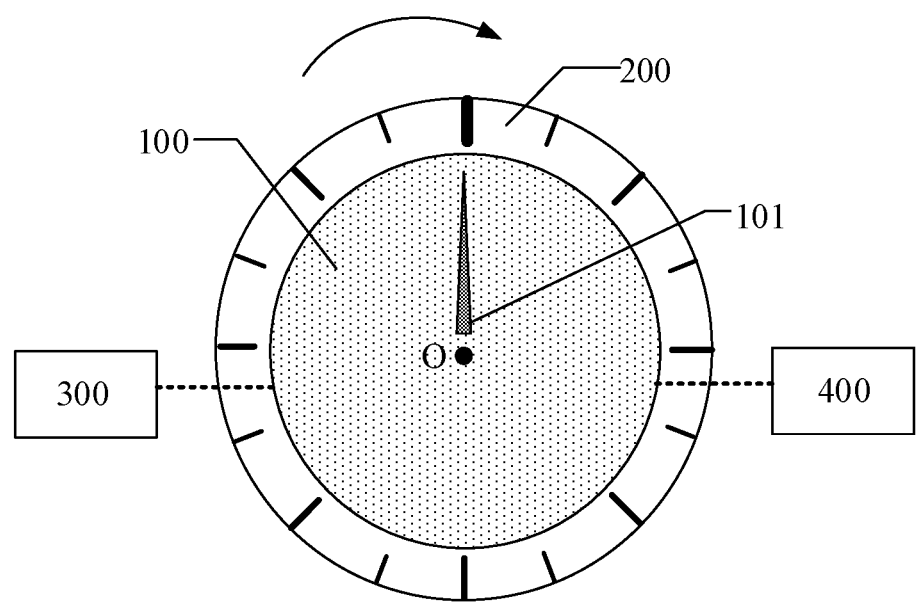
FIG. 5 is a simplified schematic diagram of a vehicle instrument according to yet another embodiment of the present disclosure.

FIG. 5 is a simplified schematic diagram of a vehicle instrument according to yet another embodiment of the present disclosure. As shown in FIG. 5, the vehicle instrument further includes a display control module 400. The display control module 400 is configured to receive a display instruction and then control the display panel 100 to perform display. In other words, the display control module 400 is electrically connected to the display panel 100, and the display control module 400 is used as a display driving module of the display panel 100. The figure merely illustrates a simplified connection between the display control module 400 and the display panel 100. However, a complex pixel circuit is required for the display of the display panel, and wirings led out from the display control module 400 are electrically connected to the pixel circuit, so as to control corresponding pixels to emit light. The actuating mechanism 300 is configured to receive a rotation instruction and then control the display panel 100 to move (e.g., rotate) relative to the dial 200. The display instruction and the rotation instruction correspond to each other. In the embodiment, as shown in FIG. 5, the display panel 100 has a rotation center O, and the rotation center O can be a rotation axis of the solid structure of the display panel 100. Under the control of actuating mechanism 300, the display panel 100 can rotate clockwise relative to the dial 200 in the figure.

During the use of the vehicle instrument, after receiving the display instruction, the display panel displays the vehicle status information according to the display instruction, and the display panel displays the pattern information while rotating with respect to the dial under control of the actuating mechanism. The position of the pattern region of the display panel is unchanged with respect to the dial. Thus, in different states, the pixels used to display the pattern in the display panel are not exactly the same, thereby avoiding the use of pixels at a fixed position for a long time to display the pattern, which would otherwise result in the burn-in. In addition, the display panel moves relative to the dial by rotating, and thus a display region and an image display region of the display panel coincide. The display region of the display panel includes all the regions of the display panel that can be used to perform display. The image display region is a region where the pixels for displaying the pattern are located in different states. That is, the display region of the display panel can be completely utilized as the image display region, thereby reducing the overall area of the display panel and increasing a degree of freedom in design of the vehicle instrument. In addition, the indicator structure on the display panel can point to a corresponding scale position on the dial after the rotation of the display panel, such that the vehicle information can be read by combining the indicator structure and the dial, thereby displaying the vehicle information with the combination of the display panel and the dial. The user can still be informed of the current vehicle status information by reading information indicated by the indicator structure and the dial even when the display panel cannot display normally. In this way, the user can make a correct judgment of the current vehicle status, and thus reduce the security hazards caused by the display abnormality.

In an embodiment of the vehicle instrument as shown in FIG. 5, under the control of the actuating mechanism 300, the display panel 100 rotates in a counterclockwise direction with respect to the dial 200.

In an embodiment of the vehicle instrument as shown in FIG. 5, under the control of the actuating mechanism 300, the display panel 100 rotates in a counterclockwise or clockwise direction with respect to the dial 200.

In some other embodiments, the display control module 400 is configured to control the display panel 100 according to display data information and rotation information of the display panel after receiving the display instruction. The display data information includes data information required by the display panel for displaying the pattern. The user can see the vehicle instrument and get the current vehicle status information after the display panel displays according to the display data information. The rotation information of the display panel is information about the rotation of the display panel with respect to the dial during the use, such as rotation angle, positional relationship before and after the rotation. The position of the display panel is changed with respect to the dial, and thus the position of the pixel in the display panel is also changed with respect to the dial. The rotation information includes information about a change of the position of the pixel in the display panel, and thus can determine coordinates of a position of a pixel for displaying the pattern in the display panel. On basis of this, the display panel is controlled to perform display in such a manner that the position of the pattern region of the display panel is unchanged with respect to the dial after the display panel rotates with respect to the dial. In this way, the pixels used to display the pattern in the display panel are not exactly the same in different states, thereby preventing the burn-in caused by the long-term use of the pixels at the same positions for displaying the pattern.

The embodiments of the present disclosure provide different technical solutions for obtaining the rotation information, which are exemplarily described below. The present disclosure includes, but is not limited to the following implementations.

Figure 6:
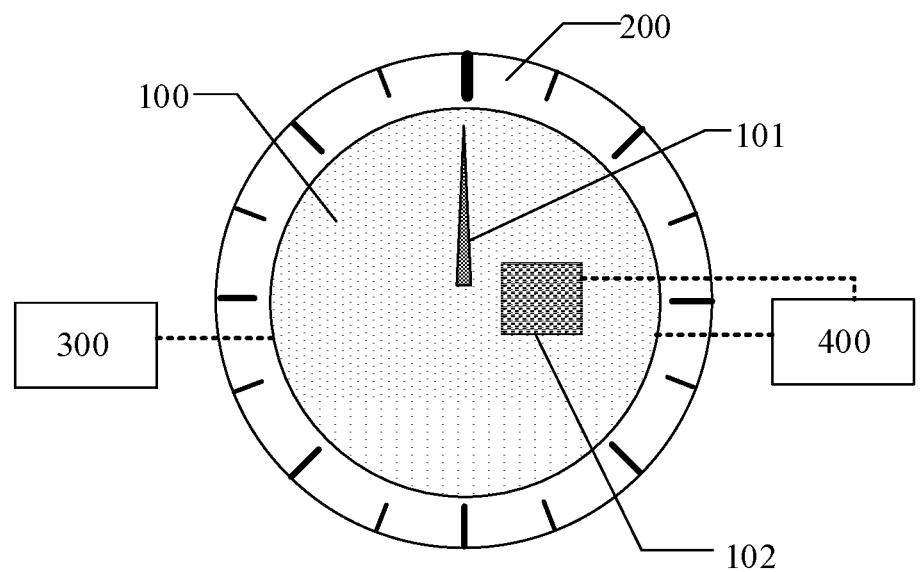
FIG. 6 is a simplified schematic diagram of a vehicle instrument according to yet another embodiment of the present disclosure.
Figure 7:
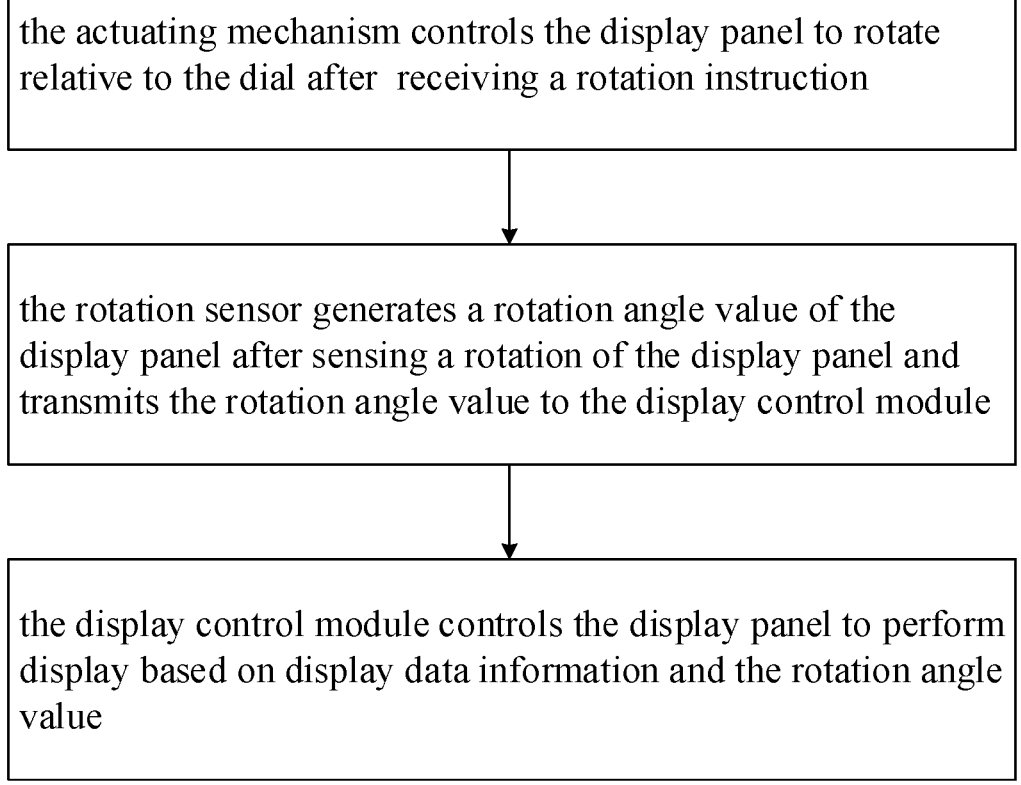
FIG. 7 is a display flow diagram of the vehicle instrument according to the embodiment shown in FIG. 6.

In an embodiment, the display instruction includes the display data information, and the rotation information includes a rotation angle value. After a sensor senses the rotation of the display panel, the display panel is controlled to perform display based on the rotation information of the display panel. FIG. 6 is a simplified schematic diagram of a vehicle instrument according to yet another embodiment of the present disclosure, and FIG. 7 is a display flow diagram of the vehicle instrument according to the embodiment shown in FIG. 6. As shown in FIG. 6, the display panel 100 further includes a rotation sensor 102, and the rotation sensor 102 is electrically connected to the display control module 400. In an embodiment, the rotation sensor includes a torque sensor, a laser gyro, or the like. In the drawings, the position of the rotation sensor 102 in the display panel 100 is merely illustrative, and not intended to limit the present disclosure. The rotation sensor 102 is configured to determine the rotation angle value of the display panel according to the rotation of the display panel 100, and to transmit the rotation angle value to the display control module 400. The display control module 400 controls the display panel to perform display according to the display data information and the rotation angle value.

As shown in FIG. 7, during the use of the vehicle instrument, the actuating mechanism 300 controls the display panel 100 to rotate with respect to the dial after receiving the rotation instruction; the rotation sensor 102 senses the rotation of display panel to generate the rotation angle value, and transmits the rotation angle value to the display control module 400; the display control module 400 receives the rotation angle value, and also receives the display instruction corresponding to the rotation instruction and including the display data information; and the display control module 400 controls the display panel 100 to perform display according to the display data information and the rotation angle value. During the use of the vehicle instrument provided by the present embodiment, the display panel 100 is first controlled to rotate with respect to the dial 200. If the position of the indicator structure 101 is fixed on the display panel 100, the indicator structure 101 points to a target scale on the dial 200 after the display panel 100 rotates with a certain angle. If the position of the indicator structure 101 is changed on the display panel 100, the indicator structure 101 points to an aimed scale on the dial 200 after the display panel 100 rotates with a certain angle correspondingly. With the rotation of the display panel, the rotation sensor 102 senses the rotation and generates the rotation angle value of the display panel 100 with respect to the initial position, and transmits the rotation angle value to the display control module 400. The display control module 400 can determine the position of the pixel for displaying the pattern in the display panel according to the rotation angle value. Then, the display control module obtains information about the position of the pixel according to the display data information and the rotation angle value, so as to control the display panel to perform display. In this way, the position of the pattern region of display panel is unchanged with respect to the dial after the rotation of the display panel with respect to the dial, thereby preventing the burn-in caused by the long-term use of the pixels at the same positions for displaying the pattern.

In an embodiment, the display instruction includes the display data information and the rotation information. The display instruction received by the display control module includes the rotation information of the display panel, and the rotation of the display panel with respect to the dial and the display panel displaying the pattern can be performed at the same time. For example, FIG. 8 is a simplified schematic diagram of a vehicle instrument according to yet another embodiment of the present disclosure, and FIG. 9 is a display flow diagram of the vehicle instrument according to the embodiment shown in FIG. 8. As shown in FIG. 8, the display control module 400 includes an angle calculation sub-module 401, and the angle calculation sub-module 401 is configured to calculate the rotation angle value of the display panel 100 according to the rotation information; and the display control module 400 controls the display panel 100 to perform display according to the display data information and the rotation angle value.

As shown in FIG. 9, during the use of the vehicle instrument, the display instruction received by the display control module 400 includes the display data information and the rotation information, the angle calculation sub-module 401 in the display control module 400 can calculate the rotation angle value of the display panel 100 according to the rotation information; and the display control module 400 controls the display panel 100 to perform display according to the display data information and the rotation angle value. FIG. 9 illustrates an operation process of the display panel 100 displaying the pattern. During the pattern displaying of the display panel 100, the display panel 100 rotates with respect to the dial 200. The display control module 400 can determine a position of a pixel for displaying the pattern in the display panel according to the calculated rotation angle value. Then, the display control module obtains the information about the position of the pixel according to the display data information and the rotation angle value, so as to control the display panel to perform display. In this way, the position of the pattern region of display panel is unchanged with respect to the dial after the rotation of the display panel with respect to the dial, thereby preventing the burn-in caused by the long-term use of the pixels at the same positions for displaying the pattern. In the present embodiment, if the position of the indicator structure 101 is fixed on the display panel 100, the indicator structure 101 points to a target scale on the dial 200 after the display panel 100 rotates with a certain angle; and if the position of the indicator structure 101 is changed on the display panel 100, the indicator structure 101 points to a target scale on the dial 200 after the display panel 100 rotates with a certain angle correspondingly. In this way, the indicator structure 101 cooperates with the rotation of the display panel 100, such that the position of the pattern region of display panel is unchanged with respect to the dial after the rotation of the display panel with a certain angle, and the vehicle status information indicated by the pattern displayed in the pattern region is consistent with the vehicle status information indicated by the scale to which the indicator structure points. The user can still be informed of the current vehicle status information by reading information indicated by the indicator structure and the dial and make a correct judgment on the current vehicle status even when the display panel cannot display normally, thereby reducing the security hazards.

Figure 10:
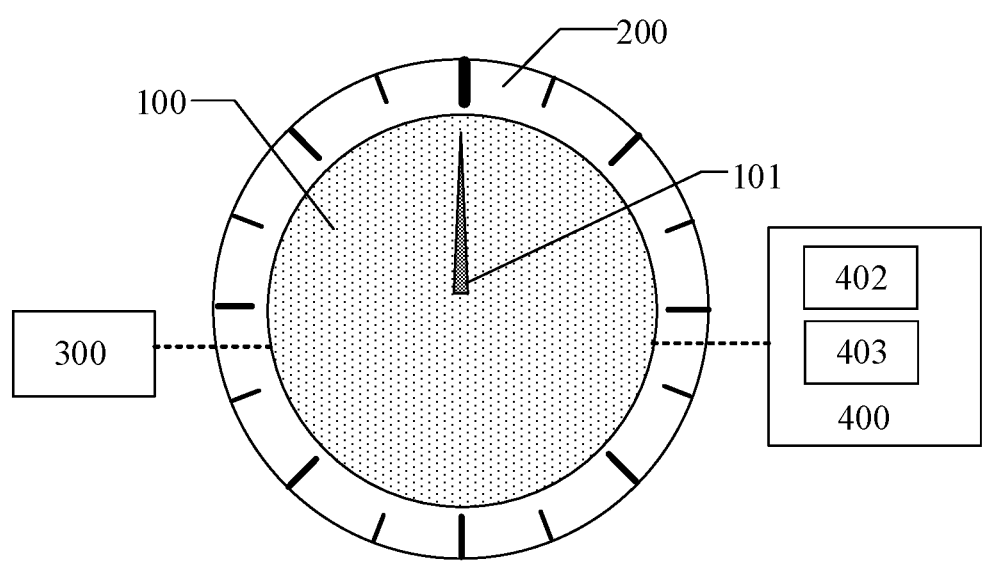
FIG. 10 is a simplified schematic diagram of a vehicle instrument according to yet another embodiment of the present disclosure.

In some embodiments, the present disclosure provides a method for controlling the display panel to perform display according to the obtained rotation information, so as to ensure the pattern region of the display panel to be unchanged with respect to the dial after the display panel rotates with respect to the dial in different states. FIG. 10 is a simplified schematic diagram of a vehicle instrument according to yet another embodiment of the present disclosure, and FIG. 11 is a simplified schematic diagrams of the vehicle instrument provided in the embodiment of the present disclosure before and after the display panel rotates with respect to the dial.

As shown in FIG. 10, the display control module 400 includes a display region determination sub-module 402 and a data output sub-module 403. The display region determination sub-module 402 is configured to determine a correspondence relationship between the display panel in a rotated state, in which the display panel has been rotated, and the display panel in an initial state based on the rotation information, and the data output sub-module 403 is configured to output the display data information to the display panel in the rotated state based on the correspondence relationship.

The principle is explained by taking the rotation information including information on the rotation angle of the display panel as an example. In an embodiment, a coordinate system can be established to determine coordinates of a position of the pixel in the display panel in the initial state, and to determine coordinates of a position of the pixel corresponding to the pattern region after the rotation of the display panel according to the determined correspondence relationship. In order to ensure that the position of the pattern region of the display panel remains unchanged with respect to the dial, the data information is input to a plurality of corresponding pixels in the pattern region of the display panel in the rotated state, so as to achieve display in the pattern region. As shown in FIG. 11, the display region determination sub-module determines the correspondence relationship between the display panel in the rotated state and the display panel in an initial state based on the rotation information, for example, the display panel 100 rotates with respect to the dial 200 by 180°. The initial state Z1 of the display panel and the rotated state Z2 of the display panel are illustrated in the figures. Each pixel in the display panel has corresponding position coordinates, for example, (1.1) represents a first pixel in a first row, and (3.3) represents a third pixel in a third row. After the rotation of the display panel, the position of the pattern region Q is unchanged with respect to the dial 200. In the initial state Z1, the pixels for displaying pattern in the pattern region Q are (7.3), (7.4), (7.5), (8.2), (8.3), (8.4), (9.2), (9.3), and (9.4). According to the correspondence relationship between the display panel in the rotated state and the display panel in the initial state, the pixels for image display in the pattern region Q in the rotated state Z2 of the display panel are determined to be (2.2), (2.3), (2.4), (3.2), (3.3), (3.4), (4.3), (4.4), and (4.5). Then, the data output sub-module outputs the display data information to the corresponding pixels in the pattern region of the display panel in the rotated state.

Figure 11:
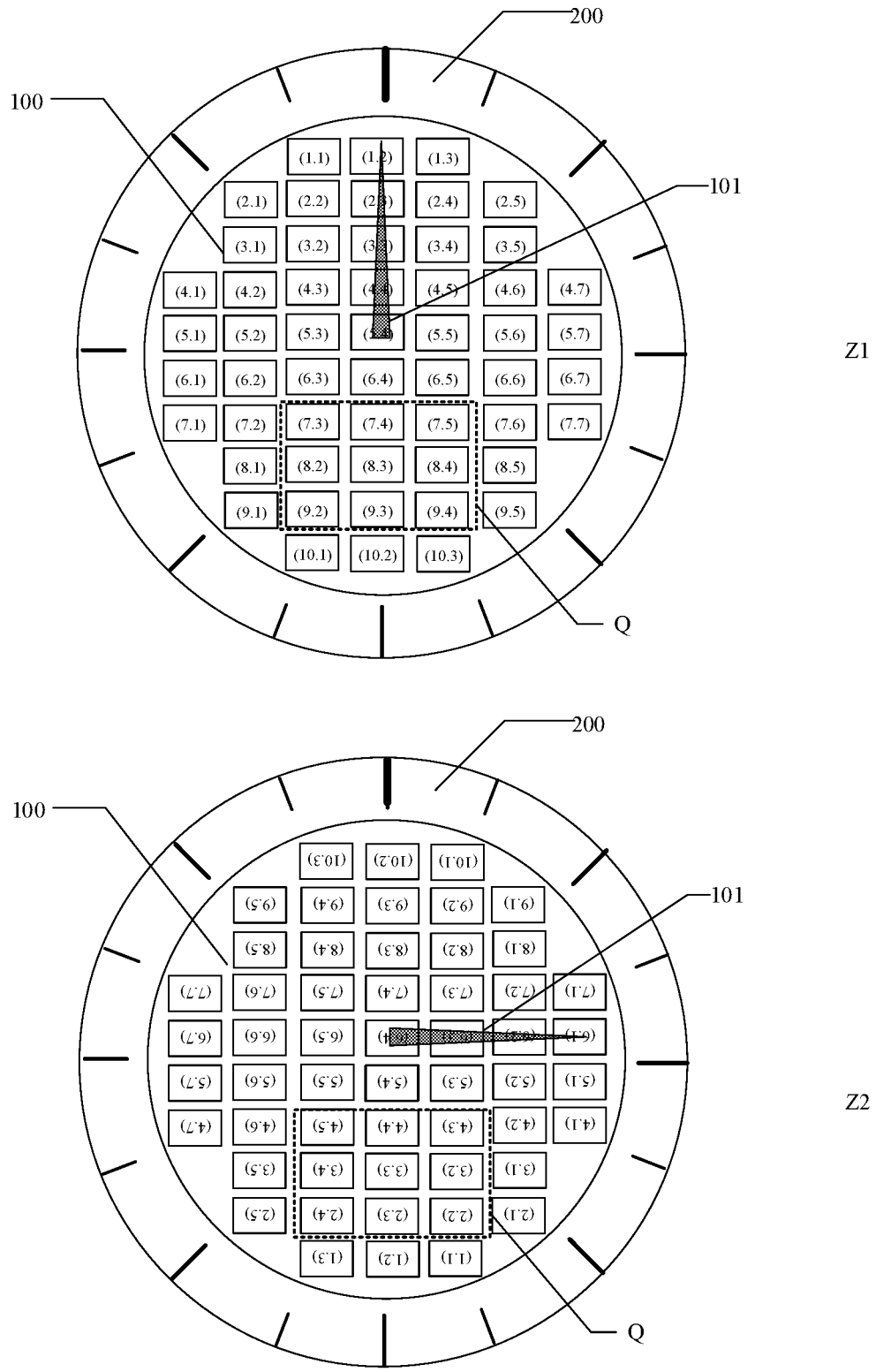
FIG. 11 is simplified schematic diagrams of a vehicle instrument according to an embodiment of the present disclosure before and after a display panel rotates relative to a dial.

It should be understood that FIG. 11 merely aims to illustrate a principle of operation, but is not intended to limit the present disclosure. The rotation angle of the indicator structure 101 with respect to the dial 200 is shown in FIG. 11, which is different from the rotation angle of the display panel 100 with respect to the dial 200, i.e., the rotation of the indicator structure 101 is not synchronized with the rotation of the display panel 100, and the position of the indicator structure 101 on the display panel 100 is not fixed. The display control module shown in FIG. 11 determines the position coordinates of the pixels corresponding to the pattern region according to the rotation information of the display panel, so as to control the display panel in the rotated state to output the display data information. The same also applies to the vehicle instrument in which the position of the indicator structure is fixed on the display panel, which will not be repeated herein.

Figure 12:
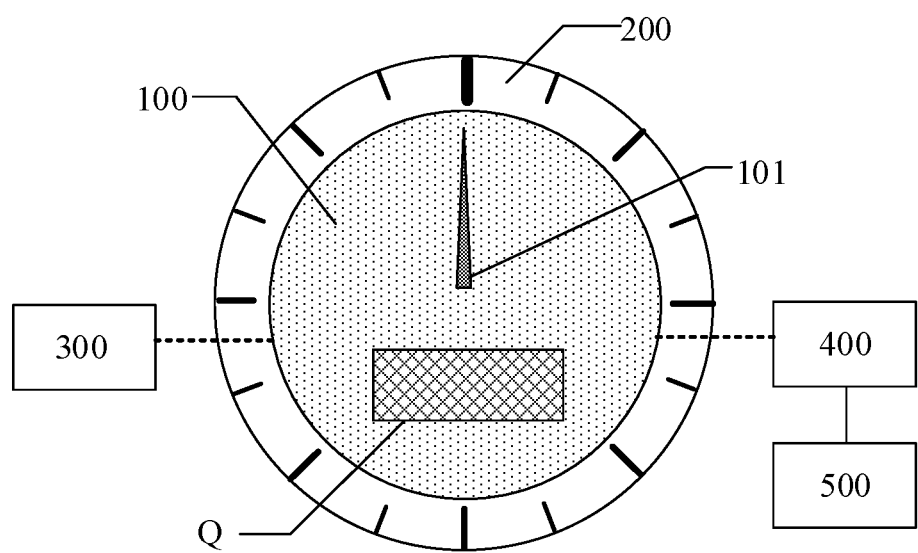
FIG. 12 is a simplified schematic diagram of a vehicle instrument according to yet another embodiment of the present disclosure.

FIG. 12 is a simplified schematic diagram of a vehicle instrument according to yet another embodiment of the present disclosure. As shown in FIG. 12, the vehicle instrument further includes a storage module 500. The storage module 50 is configured to store a first correspondence relationship. The first correspondence relationship is a correspondence relationship between angle values and position coordinates of each pixel in the pattern region Q, and the pattern region Q is fixed with respect to a position of the dial. The pattern region Q is a region in the display panel for displaying the pattern during the use of the vehicle instrument. The position of the pattern region Q in the figure is merely illustrative. In practice, the position of the pattern region can be determined in accordance with the display content or design requirements. In some embodiments of the present disclosure, during the use of the vehicle instrument, the position of the pattern region Q of the display panel 100 is fixed with respect to the dial 200, but the display panel 100 rotates with respect to the dial 200. In this way, the pixels for displaying the pattern in the pattern region Q are not completely identical at different positions of the display panel with respect to the dial during the rotation. The first correspondence relationship refers to position coordinates of each pixel for displaying the pattern in the pattern region Q at different preset rotation angles of the display panel with respect to the dial. That is, multiple groups of correspondence relationships are recorded in the first correspondence relationship. With reference to the above embodiment corresponding to FIG. 11, FIG. 11 illustratively shows a group of correspondence relationships in the first correspondence relationship, i.e., position coordinates of pixels in the pattern region Q corresponding to a rotation angle value of 180°.

The display control module 400 is connected to the storage module 500, and the display control module 400 is further configured to search for position coordinates of a corresponding pixel in the pattern region in the first correspondence relationship based on the rotation angle value, so as to obtain the position coordinates of the corresponding pixel to be used for display. The display control module 400 is further configured to control the display panel 100 to perform display based on the position coordinates of the pixel to be used for display.

In the vehicle instrument provided by the embodiments of the present disclosure, the actuating mechanism controls the display panel to move relative to the dial, such that the pattern region of the display panel is the same and the relative positional relationship between the display panel and the dial is different at different states, thereby preventing the burn-in caused by the long-term use of the pixels at the same positions for displaying the pattern. In the meantime, since the vehicle information indicated by the indicator structure together with the dial is consistent with the vehicle information displayed by the display panel, the user can still be informed of the current vehicle status information by reading information indicated by the indicator structure and the dial. Therefore, the user can make a correct judgment on the current vehicle status even when the display panel cannot display normally, thereby reducing the security hazards caused by the display abnormality. In addition, in the present embodiment, by storing the first correspondence relationship in the storage module, during the use of the vehicle instrument, the position coordinates of the pixels corresponding to the pattern region after the display panel is rotated can be directly searched in the first correspondence relationship based on the rotation angle value of the display panel, and then the pixels corresponding to the found position coordinates are controlled to emit light and perform display. In this way, without any additional calculation, the display data can be output and the vehicle status information required for being displayed on the vehicle instrument can be displayed by the pattern region. Therefore, the processing of the display control module can be accelerated, and thus a response time of the display panel is shortened. After receiving the display instruction, the display panel can quickly respond and display.

Figure 13:
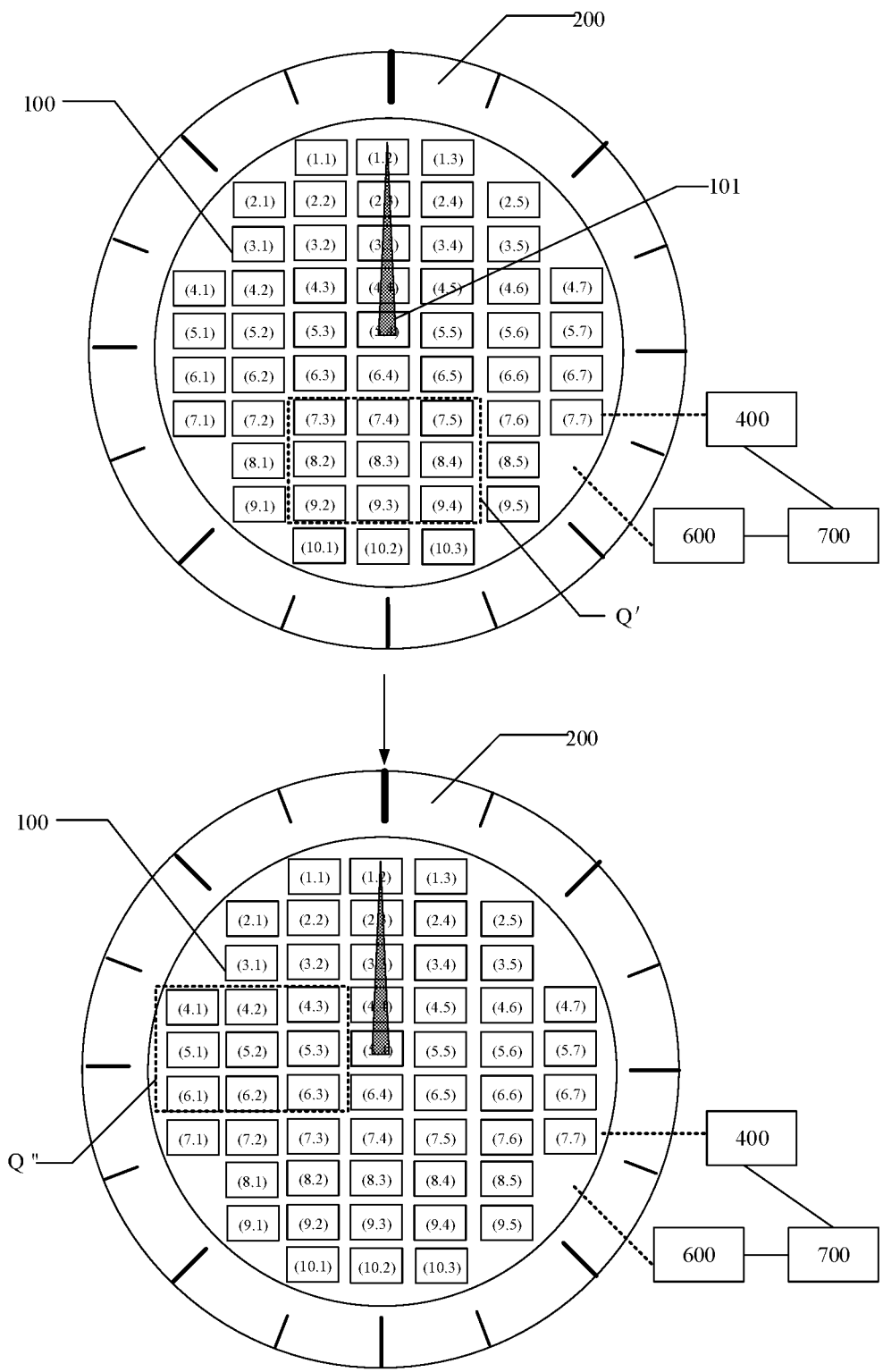
FIG. 13 is a simplified schematic diagram of a vehicle instrument according to yet another embodiment of the present disclosure.

FIG. 13 is a simplified schematic diagram of a vehicle instrument according to yet another embodiment of the present disclosure. As shown in FIG. 13, the vehicle instrument further includes a failure detection module 600 and a failure processing module 700. The failure detection module 600 is configured to detect a display state of a current pattern region Q', and, when detecting an abnormal region in the current pattern region Q', to record position coordinates of a pixel corresponding to the abnormal region. In an embodiment, the position coordinates of the pixels are defined with reference to the description of the embodiment shown in FIG. 11. As shown in this figure, the pixels for image display in the pattern region Q' are (7.3), (7.4), (7.5), (8.2), (8.3), (8.4), (9.2), (9.3), and (9.4). These position coordinates of the pixels are recorded as the position coordinates of the pixels corresponding to the abnormal region.

The failure processing module 700 is connected to the failure detection module 600 and the display control module 400. The failure processing module 700 is configured to, based on the position coordinates of each pixel in the display panel 100 and the position coordinates of the pixel corresponding to the abnormal region, generate and record position coordinates of a pixel corresponding to a new pattern region Q" as new position coordinates, and transmit the new position coordinates to the display control module. In an embodiment, as shown in the figure, the new pattern region Q" is defined, and the position coordinates of the corresponding pixels are (4.1), (4.2), (4.3), (5.1), (5.2), (5.3), (6.1), (6.2), and (6.3). The display control module 400 is further configured to control the new pattern region Q" to perform display based on the new position coordinates.

In the vehicle instrument provided by the embodiments of the present disclosure, the actuating mechanism controls the display panel to move relative to the dial, such that the pattern region of the display panel is the same and the relative positional relationship between the display panel and the dial is different at different states, thereby preventing the burn-in caused by the long-term use of the pixels at the same positions for displaying the pattern. In the meantime, since the vehicle information indicated by the indicator structure together with the dial is consistent with the vehicle information displayed by the display panel, the user can still be informed of the current vehicle status information by reading information indicated by the indicator structure and the dial and make a correct judgment on the current vehicle condition even when the display panel cannot display normally, thereby reducing the security hazards caused by the display abnormality. In addition, the vehicle instrument provided by the present embodiments can detect an abnormality of the pattern region. A new pattern region is redefined in the display region of the display panel once a display abnormality is detected. When the display abnormality occurs in a partial area of the display panel, the vehicle status information, which needs to be displayed by the vehicle instrument, can still be displayed in the normal display region. This can prevent the user from misjudging the vehicle status during driving due to the display abnormality of the vehicle instrument, which would otherwise affect the safety of driving.

Figure 14:
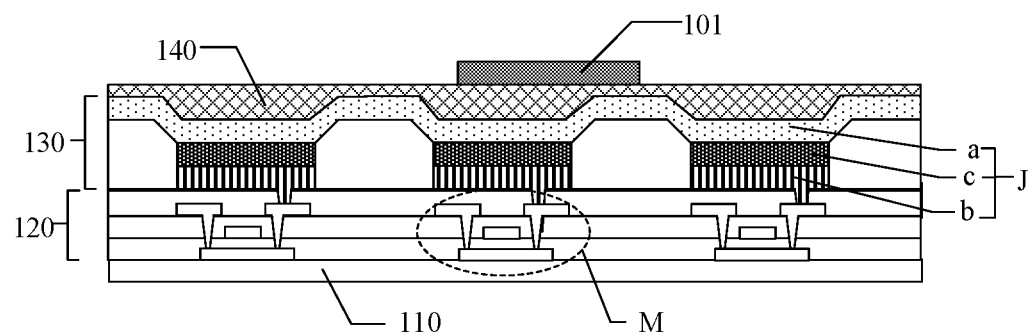
FIG. 14 is a structural diagram of film layers at A-A' shown in FIG. 1 according to an embodiment.

FIG. 14 is a structural diagram of film layers at A-A' shown in FIG. 1 according to an embodiment. As shown in FIG. 14, the display panel 100 includes a base substrate 110, an array layer 120, a display layer 130, and an encapsulating structure 140 that are sequentially stacked. The indicator structure 101 is located on a side of the encapsulating structure 140 facing away from the display layer 130. As shown in the figure, the display layer 130 includes a light-emitting device J, and the light-emitting device includes a first electrode b, a light-emitting layer c, and a second electrode a that are sequentially stacked. A plurality of transistors M is provided in the array layer, and the first electrode b of the light-emitting device is electrically connected to a source or drain of the transistor M. The transistor M shown in the figure is illustrated as a top-gate structure. The transistor M can also be in a bottom-gate structure. The encapsulating structure 140 is used for encapsulating the display layer 130 to prevent the light-emitting device J from being damaged by water and oxygen in the air. The encapsulating structure 140 can be a rigid encapsulation or a thin film encapsulation. When the encapsulating structure 140 is the rigid encapsulation, the encapsulating structure 140 includes encapsulating glass and glue. When the encapsulating structure 140 is the thin film encapsulation, it includes at least one organic encapsulating layer and at least one inorganic encapsulating layer. In this embodiment, the indicator structure 101 is disposed on the side of the encapsulating structure 140 fang away from the display layer 130. That is, the encapsulating structure 101 is fabricated with gray or white materials after the encapsulating structure 140 is fabricated in the display panel. The position of the indicator structure 101 is fixed on the display panel. When the display panel 100 rotates with respect to the dial 200, the rotation angle of the indicator structure 101 with respect to the dial 200 is the same as the rotation angle of the display panel with respect to the dial 200.

In an embodiment, the indicator structure 101 is located on a side of the encapsulating structure 140 close to the display layer 130, which is not shown in the figure.

In some embodiments, the display panel can be a liquid crystal display panel. The display panel includes an array substrate, an opposite substrate disposed opposite to the array substrate, and a liquid crystal layer located between the array substrate and the opposite substrate. The indicator structure can be located at a side of the opposite substrate facing away from the liquid crystal layer.

In some embodiments, the vehicle instrument provided by the present disclosure further has a third state. In the third state, the display panel and the dial are in a fourth positional relationship, the display panel is unable to display a pattern normally, and a display value of the vehicle instrument is read by means of the indicator structure and the scale on the dial. The indicator structure is a solid structure on the display panel. Regardless of whether the display panel can display normally, the user can clearly see the indicator structure on the display panel during the use. The third state in the present embodiment is an abnormal state of the display panel during the use of the vehicle instrument. Since the display panel moves relative to the dial and the indicator structure points to a certain scale on the dial following the movement of the display panel, in the third state when the abnormality occurs on the display panel, the user can still read the display value of the vehicle instrument by combining the indicator structure and the scale on the dial to obtain the current vehicle status information that needs to be displayed by the vehicle instrument, and thus make a correct judgment on the current vehicle status, thereby reducing the security hazards during the vehicle travelling.

In some embodiments, the actuating mechanism includes a rotation structure that is fixedly connected to the display panel, and the rotation structure drives the display panel to rotate with respect to the dial. The rotation structure is fixed at any position on a side of the display panel facing away from a display side, or fixed in an opening fabricated in the display panel. The rotation structure can be any structure having a rotation function known in the related art, such as a rotation shaft. After the rotation shaft is fixedly connected to the display panel, the actuating structure receives the rotation instruction to control the rotation shaft to rotate, and the rotation shaft can drive the display panel to rotate with respect to the dial. The movement of the display panel relative to the dial is achieved by rotating the display panel, which can ensure that the display region of the display panel coincides with the image display region. The display region of the display panel includes all the regions in the display panel used for display. The image display region is a region where all pixels for displaying the pattern in different states are located. In other words, the display region of the display panel can be fully utilized as the image display region, thereby reducing the overall area of the display panel and increasing a degree of freedom in design of the vehicle instrument.

Figure 15:
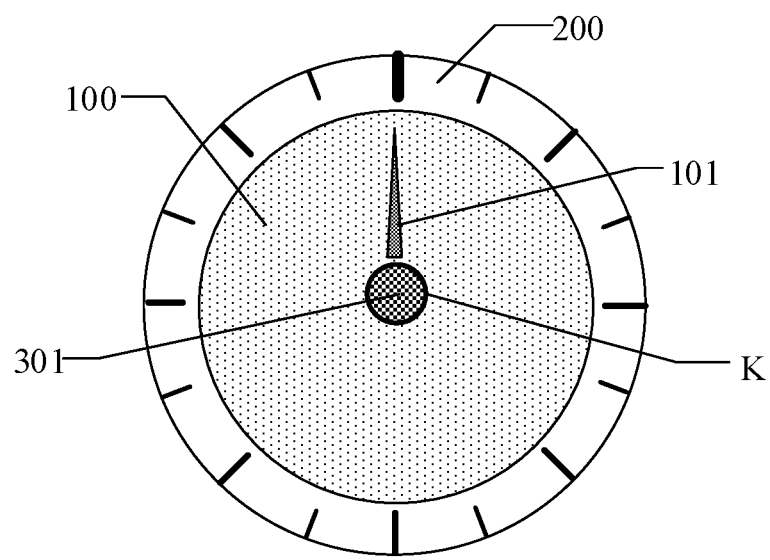
FIG. 15 is a schematic diagram of a vehicle instrument according to yet another embodiment of the present disclosure.

FIG. 15 is a schematic diagram of a vehicle instrument according to yet another embodiment of the present disclosure. As shown in FIG. 15, the display panel includes an opening K, the opening K is located at a center of the display panel, the opening K penetrates through the display panel, and a rotation structure 301 is located in the opening K. When the display panel is an organic light-emitting display panel, for example, the display panel 100 includes a base substrate, an array layer, a display layer, and an encapsulating structure that are sequentially stacked. The opening is fabricated at a predetermined position through a laser sintering process, after the array layer and the display layer are sequentially fabricated on the base substrate. When a rigid encapsulation is adopted, the display panel is encapsulated with an encapsulating glass having a hole at a corresponding position. The indicator structure may be fabricated before or after the encapsulating process. After the display panel is fabricated, the rotation structure is placed into the opening of the display panel to fixedly connect the rotation structure with the display panel.

Based on the same invention concept, the embodiments of the present disclosure further provide a display method of a vehicle instrument. The vehicle instrument adopting such a display method can be the vehicle instrument according to any embodiment described above. The vehicle instrument includes a display panel 100 and a dial 200. The display panel 100 includes an indicator structure 101, whereby the indicator structure 101 is used for pointing to a scale on the dial 200, and the indicator structure 101 is located on a display side of the display panel 100. The indicator structure 101 can be a solid structure on the display panel 100, or a pattern displayed in a displayed picture on the display panel 100. The display panel 100 exposes the dial 200. That is, the user can see the pattern displayed on the display panel 100 and the scales on the dial 200 simultaneously in a normal operation.

The display method according to the embodiments of the present disclosure includes: controlling the vehicle instrument to be in a first state, in which the display panel and the dial are in a first positional relationship, the display panel displays a first pattern region, and the first pattern region and the dial are in a second positional relationship; and controlling the vehicle instrument to be in a second state, in which the display panel and the dial are in a third positional relationship, the display panel displays the first pattern region, and the first pattern region and the dial are in the second positional relationship.

The first state and the second state of the vehicle instrument can be understood with reference to the embodiments corresponding to FIG. 3 or FIG. 4. In these two states, the position of the displayed pattern region is unchanged with respect to the dial 200, the relative positions between the display panel 100 and the dial 200 are different. In this regard, the pixels used to display the pattern in the display panel 100 are not exactly the same in these two states, preventing the burn-in caused by the long-term use of the pixels at the same positions for displaying the pattern. In addition, since the vehicle information indicated by the indicator structure together with the dial is consistent with the vehicle information displayed by the display panel, the user can still be informed of the current vehicle status information by reading information indicated by the indicator structure and the dial and make a correct judgment on the current vehicle status even when the display panel cannot display normally, thereby reducing the security hazards caused by the display abnormality.

In some embodiments, the display method provided by the present disclosure further includes:

Step S11 of controlling the display panel to perform display according to the display instruction; and Step S12 of controlling the display panel to rotate with respect to the dial according to the rotation instruction, the display instruction and the rotation instruction corresponding to each other.

During the use of the vehicle instrument, which adopts the display method according to the present embodiment, the display panel receives the display instruction and then displays the vehicle status information according to the display instruction. The display panel rotates with respect to the dial under the control of the actuating mechanism while displaying the pattern information, and the position of the pattern region of the display panel is unchanged with respect to the dial. In this way, the pixels used to display the pattern in the display panel are not exactly the same in these two states, preventing the burn-in caused by the long-term use of the pixels at the same positions for displaying the pattern. In addition, the movement of the display panel relative to the dial is achieved by rotating the display panel, which can ensure that the display region of the display panel coincides with the image display region. The display region of the display panel includes all the regions in the display panel used for displaying. The image display region is a region where all pixels for displaying the pattern in different states are located. In other words, the display region of the display panel can be fully utilized as the image display region, thereby reducing the overall area of the display panel while increasing a degree of freedom in design of the vehicle instrument.

In some embodiments of the display method according to the present disclosure, the Step S11 of controlling the display panel to perform display according to the display instruction includes Step S111 of controlling the display panel to perform display based on display data information and rotation information of the display panel.

The display data information includes data information of a pattern to be displayed on the display panel. Through display based on the display data information, the user can get the vehicle status information by observing the vehicle instrument. The rotation information of the display panel is rotation information of the display panel relative to the dial during the use, such as a rotation angle and relative positional relationships before and after the rotation. Since the position of the display panel is changed with respect to the dial, positions of pixels in the display panel are also changed with respect to the dial accordingly. Based on the rotation information, the information about the position change of the pixels in the display panel can be obtained, so that the position coordinates of the pixels used to display the pattern in the display panel can be determined, and on basis of this, the display panel can be controlled to display, and the position of the pattern region of the display panel is unchanged with respect to the dial after the display panel rotates with respect to the dial. In this way, the pixels used to display the pattern in the display panel are not exactly the same in these different states, preventing the burn-in caused by the long-term use of the pixels at the same positions for displaying the pattern.

In some embodiments of the display method according to the present disclosure, the Step S111 of controlling the display panel to perform display based on the display data information and the rotation information of the display panel includes:

Step S1111 of determining a correspondence relationship between the display panel in the rotated state and the display panel in an initial state based on the rotation information; and Step S1112 of outputting the display data information to the display panel in the rotated state based on the correspondence relationship.

For example, the rotation information includes rotation angle information of the display panel, and thus a rotation angle value, i.e., a rotation angle of the display panel between the rotated state and the initial state, can be obtained based on the rotation angle information, thereby determining the correspondence relationship between the display panel in the rotated state and the display panel in the initial state. In an embodiment, a coordinate system can be established, position coordinates of each pixel in the display panel in the initial state are determined, and according to the determined correspondence relationship, position coordinates of each pixel corresponding to the pattern region after the rotation of the display panel can be determined. In order to maintain the position of the pattern region of the display panel with respect to the dial unchanged, the data information is input to multiple pixels corresponding to the pattern region of the display panel in the rotated state, so as to achieve the display in the pattern region.

In some embodiments of the display method according to the present disclosure, the rotation information includes the rotation angle value, and the Step S111 of controlling the display panel to perform display based on the display data information and the rotation information of the display panel further includes:

Step S1113 of searching for position coordinates of a corresponding pixel in a first correspondence relationship based on the rotation angle value to obtain the position coordinates of the corresponding pixel to be used for display, in which the first correspondence relationship is a correspondence relationship between angle values and position coordinates of each pixel in the pattern display region, and a position of the pattern display region is fixed with respect to the dial; and Step S1114 of controlling the display panel to perform display based on the position coordinates of the pixel to be used for display.

In the present embodiment, the first correspondence relationship is preset. During the use of the vehicle instrument, the position coordinates of the pixels corresponding to the pattern region after the display panel is rotated can be directly searched in the first correspondence relationship based on the rotation angle value of the display panel, and then the pixels corresponding to the found position coordinates are controlled to emit light and perform display, so as to output the display data and display by the pattern region the vehicle status information required for being displayed on the vehicle instrument without any additional calculation. Therefore, a response time of the display panel is shortened. After receiving the display instruction, the display panel can quickly respond and display.

In some embodiments, the display method according to the present disclosure further includes:

Step S13 of detecting a display state of the current pattern display region, and when an abnormal region is detected in the current pattern display region, recording position coordinates of a pixel corresponding to the abnormal region;

Step S14 of generating, based on position coordinates of each pixel in the display panel and the position coordinates of the pixel corresponding to the abnormal region, position coordinates of a pixel corresponding to a new pattern display region, and recording them as new position coordinates; and Step S15 of controlling the new pattern display region to perform display based on the new position coordinates.

The display method provided by the present embodiment can detect an abnormality of the pattern region. A new pattern region is redefined in the display region of the display panel once a display abnormality is detected. In this way, when the display abnormality occurs in a partial area of the display panel, the vehicle status information, which needs to be displayed by the vehicle instrument, can still be displayed in the normal display region. This can prevent the user from misjudging the vehicle status during driving due to the display abnormality of the vehicle instrument, which would otherwise affect the safety of driving.

Figure 16:
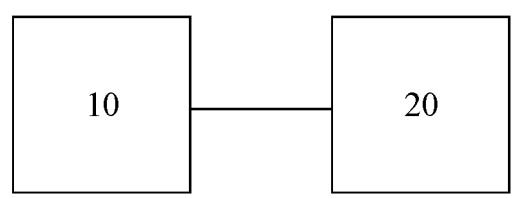
FIG. 16 is a block diagram of a vehicle speed monitoring display system according to an embodiment of the present disclosure.

Based on the same invention concept, the embodiments of the present disclosure further provide a vehicle speed monitoring display system. FIG. 16 is a block diagram of a vehicle speed monitoring display system according to an embodiment of the present disclosure. As shown in FIG. 16, the vehicle speed monitoring display system includes a vehicle speed monitoring module 10, and the vehicle instrument 20 provided in any of the embodiments of the present disclosure. The vehicle speed monitoring module 10 is configured to monitor a travelling speed of a vehicle, and the vehicle speed monitoring module 10 is connected to the vehicle instrument 20. The specific structure and operation of the vehicle instrument 20 have been described in detail in the above embodiments regarding the vehicle instrument, which will not be repeated herein.

In some embodiments, the vehicle speed monitoring module 10 generates a rotation instruction and a display instruction based on the travelling speed, transmits the rotation instruction to the actuating mechanism, and transmits the display instruction to the display control module.

The above is a detailed description of the present disclosure in connection with specific preferred embodiments, which should not be construed as all embodiments of the present disclosure. Without departing away from the concept of the present disclosure, those skilled in the related art can make various deductions or substitutions, which should be regarded as falling into the protection scope of the present disclosure.

What is claimed is:

1. A vehicle instrument, comprising:
a display panel comprising an indicator structure;
a dial exposed by the display panel; and
an actuating mechanism connected to the display panel and configured to control a movement of the display panel relative to the dial,
wherein the indicator structure is used together with a scale on the dial for reading; and
wherein the vehicle instrument has a first state and a second state,
wherein in the first state, the display panel and the dial are in a first positional relationship, the display panel displays a first pattern region, and the first pattern region and the dial are in a second positional relationship, and
wherein in the second state, the display panel and the dial are in a third positional relationship, the display panel displays the first pattern region, and the first pattern region and the dial are in the second positional relationship.

2. The vehicle instrument according to claim 1, further comprising a display control module configured to control the display panel to perform display after receiving a display instruction,
wherein the actuating mechanism is configured to control the display panel to rotate relative to the dial after receiving a rotation instruction, and
wherein the display instruction and the rotation instruction correspond to each other.

3. The vehicle instrument according to claim 2, wherein the display control module is configured to control the display panel to perform display based on display data information and rotation information of the display panel after receiving the display instruction.

4. The vehicle instrument according to claim 3, wherein:
the display instruction comprises the display data information;
the rotation information comprises a rotation angle value;
the display panel further comprises a rotation sensor that is electrically connected to the display control module and configured to determine the rotation angle value of the display panel based on a rotation of the display panel and to transmit the rotation angle value to the display control module; and
the display control module controls the display panel to perform display based on the display data information and the rotation angle value.

5. The vehicle instrument according to claim 3, wherein:
the display instruction comprises the display data information and the rotation information;
the display control module comprises an angle calculation sub-module configured to calculate a rotation angle value of the display panel based on the rotation information; and
the display control module controls the display panel to perform display based on the display data information and the rotation angle value.

6. The vehicle instrument according to claim 4, further comprising a storage module configured to store a first correspondence relationship,
wherein the first correspondence relationship is a correspondence relationship between the rotation angle value and position coordinates of each pixel in the first pattern region, and a position of the pattern region is fixed with respect to the dial;
wherein the display control module is connected to the storage module, and the display control module is further configured to search for position coordinates of a corresponding pixel in the pattern region in the first correspondence relationship based on the rotation angle value to obtain the position coordinates of the corresponding pixel that is used for display; and
wherein the display control module is further configured to control the display panel to perform display based on the position coordinates of the pixel used for display.

7. The vehicle instrument according to claim 5, further comprising a storage module configured to store a first correspondence relationship,
wherein the first correspondence relationship is a correspondence relationship between the rotation angle value and position coordinates of each pixel in the first pattern region, and a position of the pattern region is fixed with respect to the dial;

wherein the display control module is connected to the storage module, and the display control module is further configured to search for position coordinates of a corresponding pixel in the pattern region in the first correspondence relationship based on the rotation angle value to obtain the position coordinates of the corresponding pixel that is used for display; and wherein the display control module is further configured to control the display panel to perform display based on the position coordinates of the pixel that is used for display.

8. The vehicle instrument according to claim 3, wherein:
the display control module comprises a display region determination sub-module and a data output sub-module;
the display region determination sub-module is configured to determine a correspondence relationship between the display panel in a state in which the display panel has been rotated, and the display panel in an initial state based on the rotation information, and
the data output sub-module is configured to output the display data information to the display panel in the rotated state based on the correspondence relationship.

9. The vehicle instrument according to claim 2, further comprising a failure detection module and a failure processing module,
wherein the failure detection module is configured to detect a display state of a current pattern region, and is configured to, when detecting an abnormal region in the current pattern region, record position coordinates of a pixel corresponding to the abnormal region;
wherein the failure processing module is connected to the failure detection module and the display control module, and the failure processing module is configured to generate and record position coordinates of a pixel corresponding to a new pattern region as new position coordinates based on position coordinates of each pixel in the display panel and the position coordinates of the pixel corresponding to the abnormal region, and to transmit the new position coordinates to the display control module; and
wherein the display control module is further configured to control the new pattern region to perform display based on the new position coordinates.

10. The vehicle instrument according to claim 1, wherein the indicator structure comprises any one of an indicator line, an indicator needle, or an indicator symbol.

11. The vehicle instrument according to claim 1, wherein the vehicle instrument further has a third state, and
wherein in the third state, the display panel and the dial are in a fourth positional relationship, the display panel is unable to display an image normally, and a display value of the vehicle instrument is read by means of the indicator structure and the scale on the dial.

12. The vehicle instrument according to claim 1, wherein:
the actuating mechanism comprises a rotation structure, the rotation structure is fixedly connected to the display panel, and the rotation structure drives the display panel to rotate relative to the dial, and
the display panel comprises an opening, the opening is located at a center of the display panel, the opening penetrates through the display panel, and the rotation structure is located in the opening.

13. A vehicle speed monitoring display system, comprising:
a vehicle speed monitoring module; and
the vehicle instrument according to claim 1, wherein the vehicle speed monitoring module is configured to monitor a travelling speed of a vehicle, and the vehicle speed monitoring module is connected to the vehicle instrument.

14. The vehicle speed monitoring display system according to claim 13, wherein the vehicle speed monitoring module is further configured to:
generate a rotation instruction and a display instruction based on the travelling speed,
transmit the rotation instruction to the actuating mechanism, and
transmit the display instruction to a display control module.

15. A display method of a vehicle instrument, the vehicle instrument comprising a display panel and a dial, the display panel comprising an indicator structure, the indicator structure being used together with a scale on the dial for reading, the indicator structure being disposed at a display side of the display panel, and the dial being exposed by the display panel,
wherein the display method comprises:
controlling the vehicle instrument into a first state, wherein in the first state, the display panel and the dial are in a first positional relationship, the display panel displays a first pattern region, and the first pattern region and the dial are in a second positional relationship; and
controlling the vehicle instrument into a second state, wherein in the second state, the display panel and the dial are in a third positional relationship, the display panel displays the first pattern region, and the first pattern region and the dial are in the second positional relationship.

16. The display method according to claim 15, further comprising:
controlling the display panel to perform display based on a display instruction; and
controlling the display panel to rotate with respect to the dial based on a rotation instruction,
wherein the display instruction and the rotation instruction correspond to each other.

17. The display method according to claim 16, wherein said controlling the display panel to perform display based on the display instruction comprises:
controlling the display panel to perform display based on display data information and rotation information of the display panel.

18. The display method according to claim 17, wherein said controlling the display panel to perform display based on the display data information and the rotation information of the display panel comprises:
determining a correspondence relationship between the display panel in a rotated state and the display panel in an initial state based on the rotation information; and
outputting the display data information to the display panel in the rotated state based on the correspondence relationship.

19. The display method according to claim 18, wherein the rotation information comprises a rotation angle value, and said controlling the display panel to perform display based on the display data information and the rotation information of the display panel further comprises:
searching for position coordinates of a corresponding pixel in a first correspondence relationship based on the rotation angle value to obtain the position coordinates of the corresponding pixel that is used for display, wherein the first correspondence relationship is a correspondence relationship between the rotation angle value and position coordinates of each pixel in the pattern region, and a position of the pattern region is fixed with respect to the dial; and controlling the display panel to perform display based on the position coordinates of the pixel that is used for display.

20. The display method according to claim 15, further comprising:

detecting a display state of a current pattern region, and when an abnormal region is detected in the current pattern region, recording position coordinates of a pixel corresponding to the abnormal region;

generating and recording position coordinates of a pixel corresponding to a new pattern region as new position coordinates based on position coordinates of each pixel in the display panel and the position coordinates of the pixel corresponding to the abnormal region; and controlling the new pattern region to perform display based on the new position coordinate.

* * * * *